Dec. 11, 1956     E. SCHUTZ     2,773,525
RADIAL ARM SAW AND POWER FEED THEREFOR
Filed Aug. 27, 1952     4 Sheets-Sheet 1

INVENTOR
EWALD SCHUTZ
BY Strauch, Nolan & Diggins
ATTORNEYS

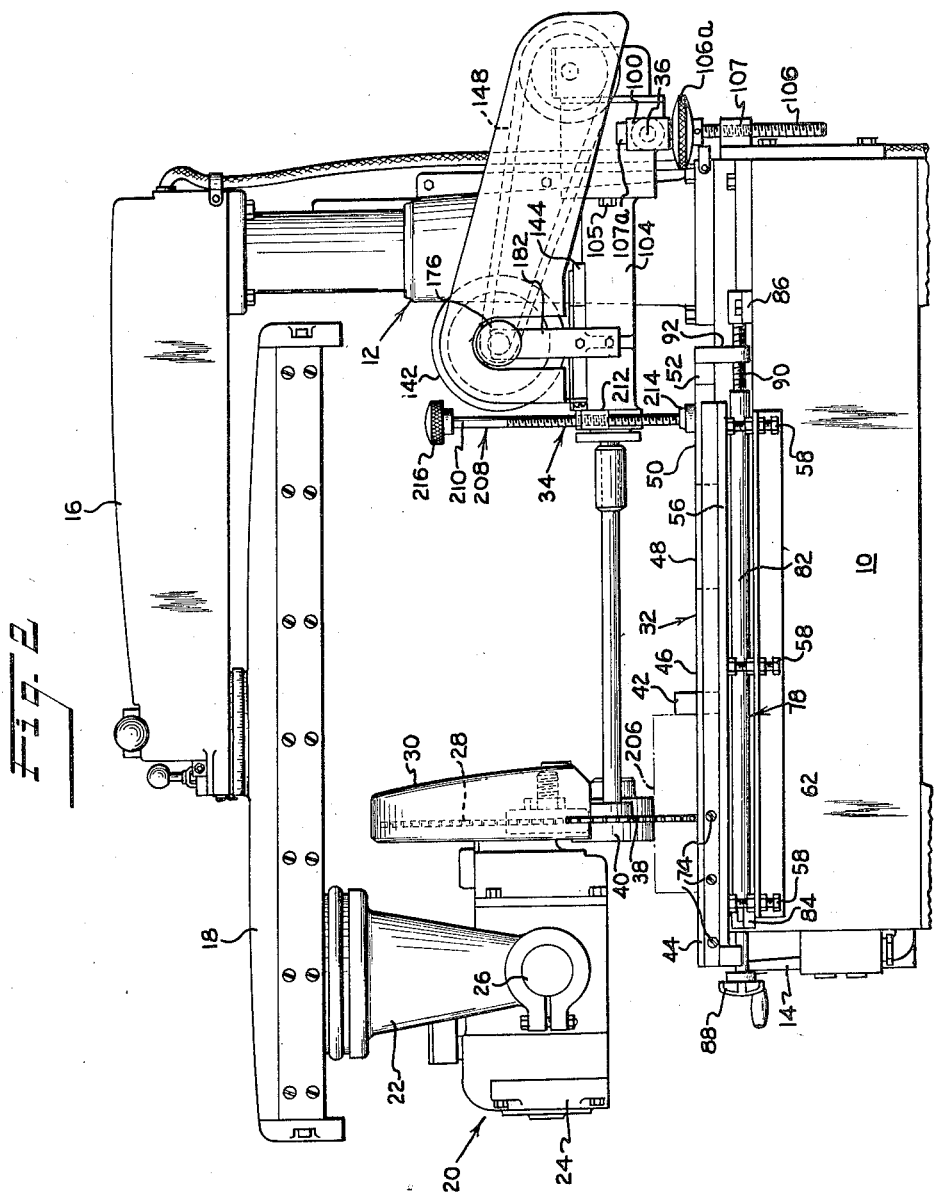

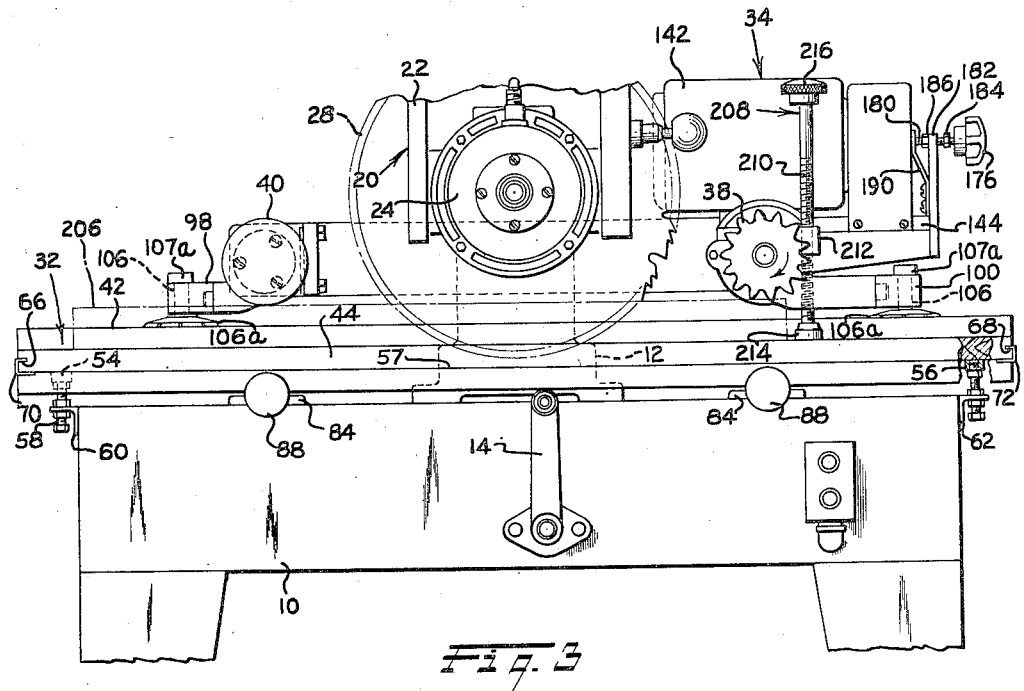
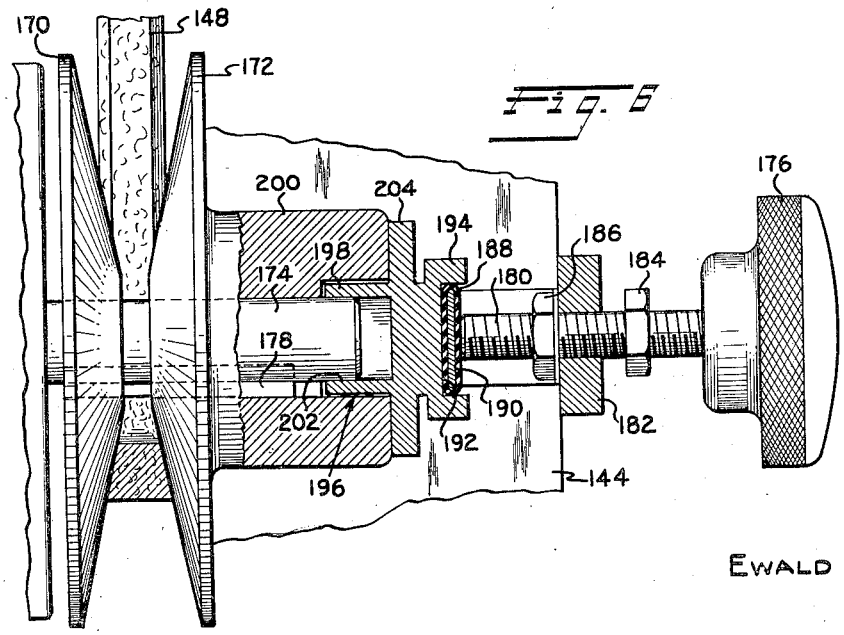

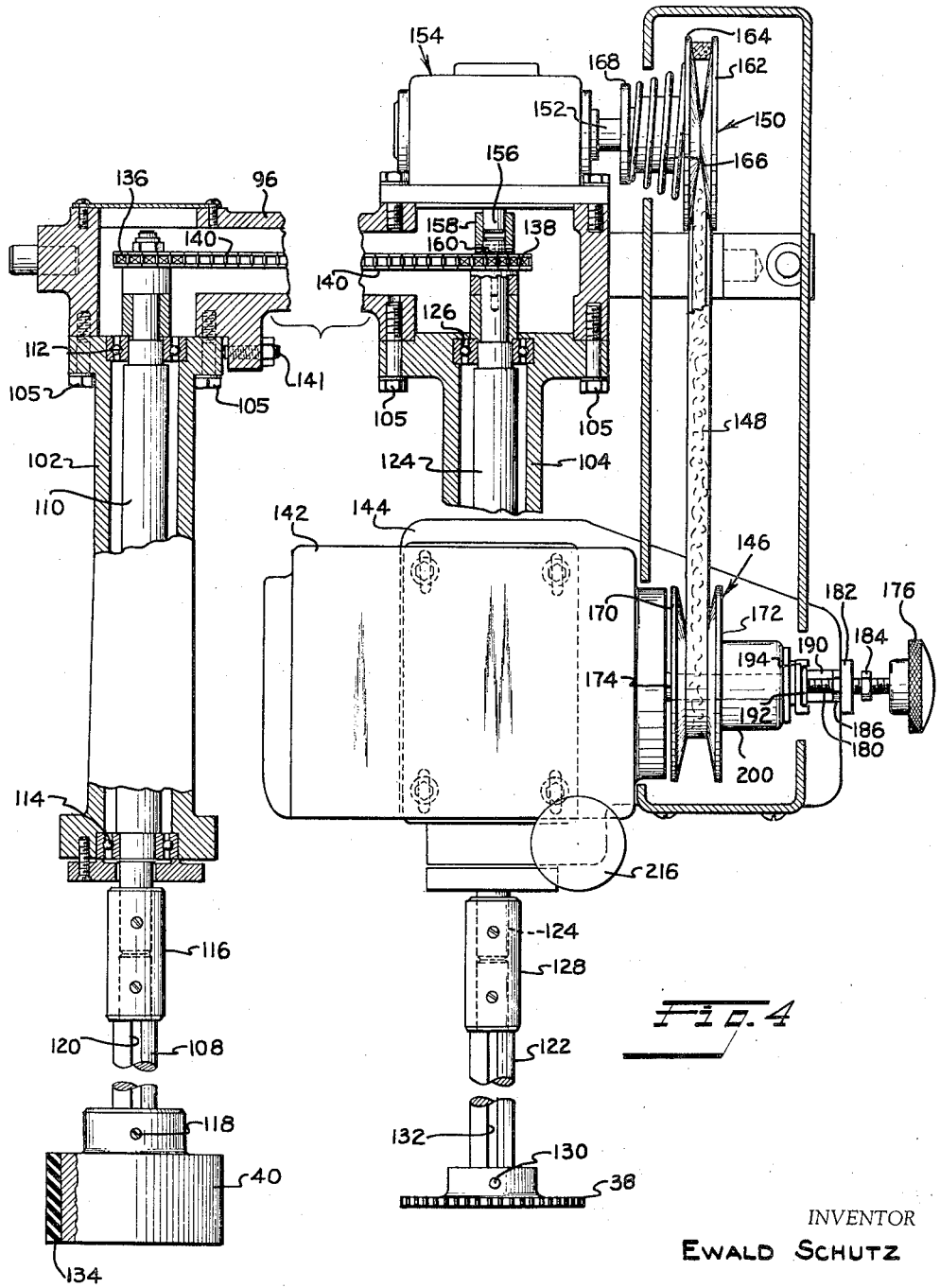

United States Patent Office
2,773,525
Patented Dec. 11, 1956

2,773,525

RADIAL ARM SAW AND POWER FEED THEREFOR

Ewald Schutz, Leetonia, Ohio, assignor to Rockwell Manufacturing Company, Pittsburgh, Pa., a corporation of Pennsylvania Application August 27, 1952, Serial No. 306,561

13 Claims. (Cl. 143—55)

The present invention relates in certain aspects to wood cutting machinery of the type in which a circular saw blade type power unit is adjustably mounted upon a carriage extending over a work support, and, more particularly, relates to improvements in the apparatus for feeding and guiding a work piece to the circular saw blade of power drive sawing machines for rip sawing operations.

A primary object of the present invention is to provide an improved workpiece power feed and guide for wood cutting machinery which greatly increases the work output of such machines during ripping operations by simplifying and improving the several adjustments necessary upon the change of the width thickness or type of wood board to be ripped.

In the past, powered workpiece feed attachments have been provided which comprise a unitary assembly pivotally mounted on the rear of the work support table about an axis approximately parallel to the direction of work piece feed during a ripping cut. This unitary assembly of the known power feed attachments include a toothed infeed roller and a friction outfeed roller disposed in transverse alignment with and on opposite sides of the circular saw blade, a drive motor, and a drive train interconnecting each of the feed rolls to the drive motor for concomitant rotation. In such previously known workpiece power feed attachment equipped overhead saws, the lateral work guide which is generally formed of wood, is mounted in a fixed position for all ripping operations regardless of the width of the board to be ripped from the workpiece and the adjustment for various widths or boards ripped is effected by shifting the saw unit along its carriage and independently adjusting both the infeed and outfeed rollers along the shafts upon which they are mounted into alignment with the adjusted position of a circular saw blade. It is apparent that the necessity of making these separate yet interrelated adjustments on each occasion that it is necessary to change the width of the piece of wood cut off requires an extremely wide range of adjustment of the power feed unit if both narrow and extremely wide boards are to be accommodated.

The provision for an overhead saw unit of an improved work piece power feed and guide structure which may be easily and rapidly adjusted to accommodate boards to be ripped which may vary widely in both width and thickness is, therefore, an object of the present invention of primary importance.

More specifically it is an object of this invention to accomplish this result by the provision of a novel workpiece support and lateral guide structure in which the lateral work piece guide can be shifted to any of a plurality of positions transversely the table relative to the circular saw blade and aligned power driven infeed and outfeed rollers to accommodate wide variations in width of board to be ripped.

A further specific object of this invention is the provision of a power feed attachment for powered rip saws which can be easily and rapidly adjusted to any of an infinite number of positions within the range of adjustment to accommodate and properly feed boards of varying thicknesses.

A further adjustment which must be made is the variation in the speed at which the work piece is fed to the saw blade. This adjustment must be made in accordance with the thickness of the board cut, the type of wood of which the board is made, and the dryness of the wood to assure most efficient cutting. The prior art power feed devices previously referred to have provided for speed adjustments in discrete incremental or decremental steps only which are effected by the use of step cone pulleys upon which a drive belt can be shifted only while the power feed is inoperative rather than providing a continuous variation throughout the operating speed range which can be effected during the normal operation of the power feed.

To overcome these disadvantages of the prior art power feed devices for saws by the provision of an improved and continuously variable drive speed adjustment which is easily manipulatable to effect the desired speed adjustment even during actual feeding of a workpiece so that accurate adjustment of the workpiece speed for optimum cutting conditions can be made is, therefore, a further object of this invention of primary importance.

In the prior art power feed devices previously referred to shafts upon which the feed rolls are mounted and which are drive connected by a chain and sprocket linkage are inclined slightly from the positions normal to the lateral work guide so that the feed rollers will tend to force the work piece against the work guide. This inclination of the shafts has been effected by mounting the shafts for angular adjustment relative to the main power feed support structure so that the adjustment of the inclination of the feed rolls is interdependent with the slack of the drive chain interconnecting the shafts. This frequently results in a condition in which either the chain tension is incorrect or the inclination of one or both of the feed rollers is incorrect.

It is accordingly a further object of the present invention to provide an improved power feed device which is of rigid construction, in which adjustment of the tension of the drive chain interconnecting the feed roller shaft is effected by translatory movement of a portion of the support structure upon which the outfeed shaft is journalled, and in which the proper inclination of feed rolls relative to the direction of work piece feed is attained by mounting the entire power feed support structure in an inclined position relative to the direction of workpiece feed thereby providing independent adjustments of the feed roll inclination in drive chain tension so that the optimum adjustment of each can be attained.

These and other objects of this invention will become more fully apparent by reference to the appended claims and as the following detailed description proceeds in reference to the accompanying drawings wherein:

Figure 2 is a right side elevational view of the assembly of Figure 1;

Figure 3 is a fragmentary front elevational view of the assembly of Figures 1 and 2;

Figure 4 is a plan view partially in section of the power feed assembly of the present invention.

Figure 1:
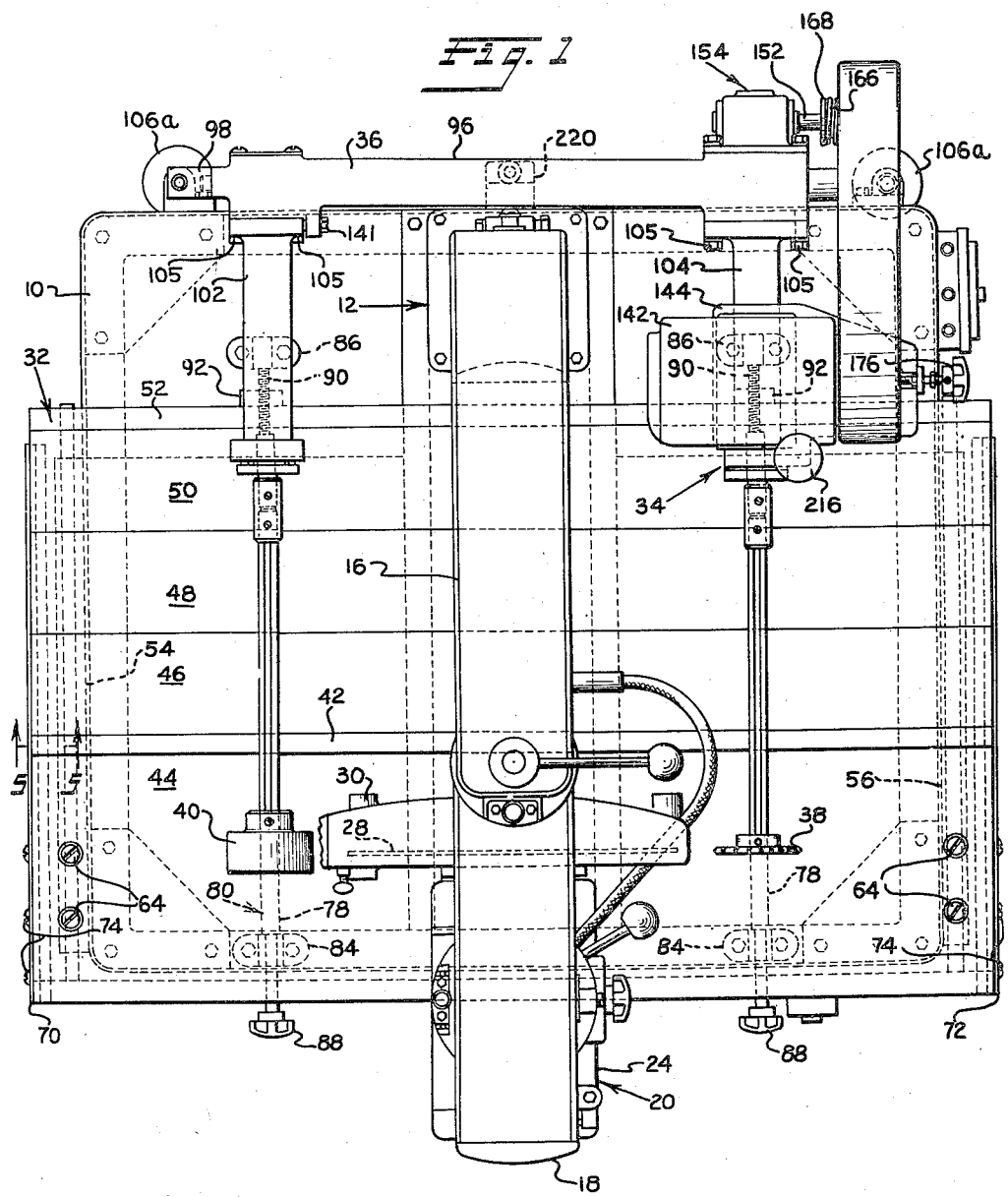
Figure 1 is a plan view in elevation of a saw assembly of the overhead type in which a power saw unit depends from a carriage extending over a work supporting base and which is provided with a power feed unit and work piece support and guide coacting therewith in accordance with the teachings of the present invention.
Figure 5:
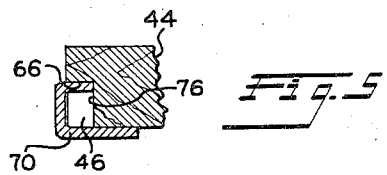
Figure 5 (Sheet 1) is a fragmentary sectional view of the work support table and lateral work guide taken substantially along the line 5—5 of Figure 1 and Figure 6 (Sheet 3) is an enlarged sectional view of the power feed speed control mechanism associated with the power feed drive motor.

Referring now in detail to the drawings and in particular in reference to Figure 2, the illustrated wood sawing machine in which the present invention is embodied comprises a base 10; a vertically adjustable telescopic column 12 which is mounted centrally of the rear edge of the base 10 vertically adjustable by manipulation of a handle 14 at the front of the base 10; a cantilever arm 16 secured at its rearward end to the upper section of the column 12; a carriage 18 mounted at the forward end of the arm 16 midway of its length for rotation relative to the arm 16 throughout 360°; a saw unit 20 including a yoke 22 mounted for translatory movement along the length of the carriage 18 and rotatable relative thereto throughout 360°, a motor 24 pivotally mounted upon the lower end of the yoke 22 about the axis 26, a circular saw blade 28 coaxially fixed to the rotor of and driven by the motor 24 and enclosed within a guard 30; a work support table 32 disposed beneath the saw unit 20, and a power feed unit 34 pivotally mounted about the axis 36 extending longitudinally along the rear of the base 10 behind the column 12 and including powered infeed roller 38 and outfeed roller 40 mounted in alignment with the circular saw blade 28.

Referring to Figures 1 and 2, the work piece support table and lateral guide structure of the present invention comprises a fence 42 and a plurality of boards 44, 46, 48, 50 and 52 which are of substantially equal length and thickness but which are of unequal width and which are mounted in alignment lengthwise, extending longitudinally of the table in side-by-side relation to form a substantially planar work support surface. These boards 44, 46, 48, 50 and 52 and the fence 42 are supported adjacent their opposite ends by cross bars 54 and 56 extending transversely of the table and mid-way of their length by a planar surface 57 formed on a transversely extending portion of the base casting of the column 12. The cross bars 54 and 56 are adjustably mounted upon the base 10 by bolt and lock nut assemblies 58 which are disposed at suitable intervals along the length of support brackets 60 and 62 secured to the base 10 as is best illustrated in Figure 2.

As is illustrated in Figure 1, the forward board 44 is fixed to the cross bars 54 and 56 by spaced screws 64. As is best illustrated in Figure 3, the boards 44, 46, 48 and 50 are formed at their ends with aligned transverse slots 66 and 68 into which is received one arm of the generally channeled sheet guide members 70 and 72 respectively. Guide members 70 and 72 are fixed to the forward board 44 by screws 74 but are not attached to the boards 46, 48, 50 or 52 or to the fence 42. By this construction, boards 46, 48 and 50 are retained against the cross bars 54 and 56 against longitudinal or vertical movement but are free to remove transversely of the base 10. The board 52, which is the narrowest of the boards, and the lateral work guide 42 are formed at their ends with notches 76 in lieu of the grooves 66 so that they are retained against endwise movement by the guides 70 and 72 but not against vertical or transverse movement.

By this construction, the narrow board 52 and/or the fence 42 can be withdrawn and either or both may be interposed between any adjacent pair of the boards 44, 46, 48 and 50 at the rear of the board 50.

Clamping means, now to be described, have been provided for clamping the boards 44, 46, 48, 50 and 52 and the work guide 42 in the selected relation. The clamping means at each side of the saw unit 20 as viewed in Figure 1 are designated 78 and 80 respectively and, is best illustrated in Figure 2, each comprises a shaft 82 rotatably mounted about an axis extending transversely of the table 32 by pillow blocks 84 and 86 secured to the base 10 and are manipulatable by handles 88 fixed to the forward end of the shafts 82. The rear end of the shafts 82 adjacent the pillow blocks 86 are formed with threaded portions 90 upon which are threadedly received clamping blocks 92. By this construction, it is apparent from Figure 1 that, by rotary manipulation of the shafts 82, the blocks 92 will be caused to clamp the boards 46, 48, 50 and 52 and the fence 42 against the rear edge of the board 44 which is fixed relative to the base as previously described. As a result of this novel table construction, the fence 42 can be readily shifted to various positions transversely of the table to accommodate a wide variety of board widths to be ripped.

As is shown in Figure 1, the power feed assembly 34 comprises a generally hollow support structure having a central portion 96 pivotally mounted at its ends in support blocks 98 and 100 (Figure 2) both of which are vertically adjustable, a pair of spaced hollow arms 102 and 104 disposed at opposite ends of the central portion 96 and rigidly secured thereto as by bolts 105.

The vertical adjustment of the central portion 96 of the hollow support structure is affected, as is best illustrated in Figure 2 in reference to support block 100, by a screw 106 having a handle 106a fixed thereto and a block 107 which is fixed to the table 10 and into which the screw 106 is threadedly received. The upper end of screw 106 is rotatably received in a bore through block 100, block 100 being axially fixed relative thereto between handle 106a and a collar 107a fixed to screw 106. By this structure, the central portion 96 of the hollow support structure can be readily and accurately adjusted to any desired vertical position within the range of adjustment by rotary manipulation of the screws 106 by the associated handles 106a.

Referring to Figure 4, the outfeed roll 40 is mounted upon a shaft 108 which is coaxial with and forms an extension of a shaft 110 journalled within the hollow housing structure arm 102 by spaced anti-friction bearings 112 and 114, shafts 110 and 108 being joined for coaxial concomitant rotation by a coupling 116. Feed roll 40 is adjustable axially of shaft 108, being provided with a set screw 118 engaging a longitudinal external groove 120 formed along the length of shaft 108.

Infeed roll 38 is similarly mounted upon a shaft 122 which forms an extension of a shaft 124 journalled in the same manner as shaft 110 in the housing structure arm 104 by spaced anti-friction bearings but one of which, 126, as shown in Figure 4. Shafts 124 and 122 are joined for concomitant rotation by coupling 128. Infeed roll 38 is mounted for adjustment axially of shaft 122, being provided with a set screw 130 engaging a longitudinally extending groove 132 formed externally along the length of the shaft 122. Infeed roll 38 is a toothed sprocket providing a positive driving engagement with a work piece feed across the table 32 whereas outfeed roll 40 is provided with a resilient covering 134 having a high coefficient of friction and effective to frictionally drive the severed work pieces without marring the top surface thereof. In operation, the tooth infeed roll 38 is aligned with the circular saw blade 28 so that any indentations in the work piece formed by the teeth of the infeed roll 38 will lie in the kerf cut by the circular saw blade 28 and therefore will not appear upon the severed work pieces. The frictional drive outfeed roll 40, in operation, straddles the kerf to impart a friction drive to both severed portions of the board being ripped.

It is in order to assure that during a cutting operation, the axes of the feed roll shafts remain substantially parallel to the table work support surface to provide a firm feeding contact of roll 40 with the severed board that adjustment of the central support structure section 96 is provided as previously described. The axes of shafts 110 and 124 are parallel and these shafts are joined at their inner ends within the hollow central housing section 96 by a sprocket and chain type drive mechanism comprising sprocket 136 fixed to the inner end of the shaft 110, sprocket 138 fixed to the inner end of the shaft 124, and a chain 140 joining the sprockets 136 and 138. Adjustment of the tension on chain 140 is effected by shifting the support structure arm 102 and the parts carried thereby in a translatory path relative to the remainder of the unit by loosening bolts 105, adjusting screw 141, and retightening bolts 105 to secure arm 102 and the sprocket 136 in the desired position relative to the central portion 96 for the proper tension of chain 140. The shafts 124 and 110 are driven from a drive motor 142 mounted upon a mounting plate 144 secured upon the housing structure arm 104 by a drive train now to be described. This drive train comprises a pulley assembly 146 driven by the shaft of motor 142, a drive belt 148 preferably of the V-belt type, a driven pulley 150 which is mounted upon the input shaft 152 of a speed reduction mechanism generally designated as 154 which may be a generally conventional worm wheel reduction drive, not shown in detail, and the output shaft of which is designated 156. The output shaft 156 of the speed reduction mechanism is coupled directly to the sprocket 138 on shaft 124 by a sleeve 158 and a stub shaft 160.

The pulley assembly 150 comprises opposed cone pulleys or sheaves 162 and 164, pulley 162 being fixed both axially and angularly relative to the shaft 152 and pulley 164 being slidable axially thereof and fixed for rotation therewith. Pulley 164 is biased into axial abutment with the pulley 162 by a spring 166 compressed between the pulley 164 and a collar 168 fixed to the shaft 152.

The driving pulley assembly 146 similarly comprises an axially fixed cone pulley 170 and an axially shiftable cone pulley 172 disposed upon the motor shaft 174 in opposed relation, cone pulley 172 being shiftable axially under the control of an adjusting knob 176 by a mechanism which is illustrated in detail in Figure 6.

Sheaf halves 170 and 172 are suitably fixed for rotation with shaft 174 as by a key 178, sheaf half 170 being axially fixed upon shaft 174 while sheaf half 172 is axially shiftable relative thereto. Sheaf half 172 is normally biased away from sheaf half 170 by the axially directed component of the force applied thereto by V-belt 148.

As has been indicated, the axial spacing between sheaf halves 170 and 172 is controlled by adjusting knob 176. Knob 176 is fixed to an adjusting screw 180 which is threadedly received through a support bracket 182 fixed to the end of plate 144 and which is provided with spaced adjustment limit nuts 184 and 186 on opposite sides of the bracket. At its end opposite that to which knob 176 is secured, screw 180 abuts against a flexible covering sleeve 188 upon a resilient control member 190 which, as is best shown in Figure 3, is fixed to bracket 182 at its lower end.

The free end of member 190 upon which the flexible sleeve 188 is received, rests within a diametrical end slot 192 formed in the head 194 of a member 196. Member 196 has a cylindrical portion 198 which is rotatably received within the end of the hub 200 of sheaf half 172 and which is formed with an end bore 202 onto which the end of shaft 124 is piloted. Member 196 is provided with a radially extending flange 204 in abutment with the end of the hub 200 of sheaf half 172, and is retained against rotation with the hub 200 by the engagement of the free end of member 190 with the slot 192.

When it is desired to shift the sheaf half 172 toward the axially fixed half 170 to increase the speed of the power feed unit, screw 180 is rotated by knob 176 to feed member 190 against member 196 and thereby free rotating sheaf half 172 toward half 170 which in turn will cause the belt 148 to ride higher on the sheaf halves 170 and 172 while effecting separation of the sheaf halves 162 and 164 of the drive pulley 150.

When it is desired to reduce the speed of the power feed unit, screw 180 is rotated in the opposite direction. By this adjustment, the speed of the power feed unit can be adjusted to the optimum for the particular cutting conditions during the actual sawing operation when necessary.

The power feed unit is supported with its feed rolls 38 and 40 above the table in a position to receive a work piece 206 by an adjustable leg 208 (Figure 2) which comprises a screw 210 threadedly received through an apertured boss 212 on the support structure arm 104, provided with a relatively rotatable foot 214 and an adjusting knob 216.

It will be apparent to those skilled in the art that the power feed unit of the present invention is not limited in its utility to overhead circular saws of the type illustrated but may be used with any powered saw adapted to rip sawing operations.

The entire power feed unit may, when not needed, be pivoted about the axis 36 to an inoperative position where it will not interfere with the use of the saw unit for purposes other than rip sawing. To support the power feed unit in such inoperative position, a stop 220 is mounted upon the rear of the table 10 in a position to engage the rear free of the central support structure section 96 when the power feed unit is so pivoted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a wood working machine characterized by the dependency of a power saw unit of the circular saw blade type from a carriage extending over the working area of the machine and the provision of a powered work piece feeding attachment for feeding a work piece to said power saw unit of such construction that a board may be fed to the saw blade of said saw unit at the optimum rate and comprising power driven infeed and outfeed rollers disposed on opposite sides of and in alignment with said saw blade and means for conjointly driving said rollers and providing an infinite variation in driving speed within a predetermined driving speed range; and a table for supporting a work piece while under the control of said feeding attachment comprising a base, a plurality of boards of substantially equal overall length longitudinally disposed on said base in side by side relation to form a planar work support table, a guide on said base at each end of said boards for maintaining the lengthwise alignment of said boards, a work guide of such shape that it can be placed on said base between said end guides in interposition between any adjacent pair of boards, and clamping means on said base for clamping said boards together transversely of said table to form a rigid work piece support and lateral guide structure which in cooperation with said power feed unit is effective to feed, support, and guide a board to said power saw unit for a rip sawing operation.

2. For use in combination with a wood working machine characterized by the association of a power driven unit with a planar work support table, a power feed unit comprising a rigid support structure pivotally mounted at and on an axis substantially parallel to the rear edge of the work support table and having at each end a hollow arm projecting over the work support table, a shaft journalled in each of said hollow arms and projecting outwardly of said hollow arms over said table, a workpiece feed roller fixed to each of said shafts outwardly of said hollow arms, a chain and sprocket drive mechanism interconnecting said shafts within said support structure for concomitant rotation, a drive motor mounted exteriorly of said support structure on one of said arms, and a drive train connecting said drive motor to the adjacent one of said shafts including a variable speed transmission of the infinitely variable speed V-belt drive type to provide a continuous speed variation within the range of speed adjustment.

3. The combination defined in claim 2 wherein said variable speed transmission comprises a first pair of axially aligned relatively axially shiftable opposed cone pulleys resiliently biased toward axial abutment, a second pair of axially aligned relatively axially shiftable opposed cone pulleys mounted in spaced parallel relation to said first pair, a V-belt interconnecting said pulleys, and means for shifting the axial spacing between said second pair of cones to produce a simultaneous and opposite axial spacing shift of said first pair to vary the angular velocity ratio between said pulleys.

4. For use in combination with a wood working machine characterized by the association of a power driven saw unit with a planar work support table, a power feed unit comprising a hollow support structure comprising a central portion extending along the rear edge of said table and pivotally mounted thereon about an axis substantially parallel to the direction of work feed along said table and a hollow arm rigidly secured to each end of said central portion, said arms extending over said table normal to said central portion at each side of said saw unit, a pair of shafts which are respectively journalled in the arms of said housing, a chain and sprocket drive mechanism interconnecting said shafts through said central support structure portion, said shafts projecting outwardly of the free ends of said structure arms and each having a workpiece feed roll secured thereto on the projecting portion of said shafts, a drive motor mounted on one arm of said support structure intermediate the feed roll thereof and said pivot axis, a drive train drive connecting said motor to the shaft journalled in said one arm, and means for shifting the other of said arms in a translatory path relative to said central portion and said one arm to vary the spacing between said shafts and thereby adjust the tension of said drive chain while maintaining the parallel relation of said feed roll shafts.

5. A saw adapted to accommodate wide varieties of widths, depths and hardnesses of boards comprising a work support table, a work guide fence extending parallel to one side of said work support table, means including portions of said table for clamping said fence to said table at any selected one of a plurality of predetermined positions spaced at right angles to said one side of said table to effect major width adjustments of the cut, power driven means for feeding a work piece along said fence and selectively operable to effect work piece movement over said table parallel to said one side at any selected one of an infinite number of speeds within a predetermined range of speeds to match the feed speed to the cutability of the work piece, and a power driven circular saw unit mounted above said table for movement normal to said table to effect minor or vernier width adjustment of the cut and normal to said fence to cooperate with said fence to determine the distance of the cut from the fence in a sawing operation and to vary the depth of cut as required.

6. The saw defined in claim 5 wherein said table comprises a base, a guide disposed at each end of said base, a plurality of rectangular plate-like members of substantially equal length extending longitudinally of said base between said guides in side by side relation, said guides so engaging each of said members at its opposite ends as to retain said members against all movement other than translatory movement transversely of said base, wherein said clamping means includes a pair of clamps on said base for transversely clamping said members together, and wherein said fence is of such construction that it may be interposed between any adjacent pair of said members and rigidly retained in such position by actuation of said clamps.

7. The saw defined in claim 5 wherein said power driven means comprises power driven infeed and outfeed rollers disposed on opposite sides of and in alignment with the saw blade of said saw unit, and means conjointly driving said rollers and providing an infinite variation in driving speed within a predetermined driving speed range.

8. The saw defined in claim 5 wherein said power driven means comprises infeed and outfeed rollers disposed on opposite sides of and in alignment with the circular saw blade of said saw unit, and means conjointly driving said feed rollers including means operable while said feed rollers are being driven providing an infinite variation in the driving speed of said feed rollers within a predetermined driving speed range.

9. The saw defined in claim 5 wherein said power driven means comprises a rigid support structure rigidly mounted at the rear edge of said table and having at each end a hollow arm projecting over said table, a shaft journalled in each of said hollow arms and projecting outwardly of said hollow arms over said table, a workpiece feed roller fixed to each of said shafts outwardly of said hollow arms, a chain and sprocket drive mechanism interconnecting said shafts within said support structure for concomitant rotation, a drive motor mounted exteriorly of said support structure on one of said arms, and a drive train connecting said drive motor to the adjacent one of said shafts including a speed varying mechanism operable to provide a continuous speed variation within a predetermined range of speed adjustment.

10. The saw defined in claim 5 wherein said power driven means comprises a rigid support structure pivotally mounted at the rear edge of said table and having at each end a hollow arm projecting over said table, a shaft journalled in each of said hollow arms and projecting outwardly of said hollow arms over said table, a workpiece feed roller fixed to each of said shafts outwardly of said hollow arms, a chain and sprocket drive mechanism interconnecting said shafts within said support structure for concomitant rotation, a drive motor mounted exteriorly of said support structure on one of said arms, and a drive train connecting said drive motor to adjacent one of said shafts including a variable speed transmission of the infinitely variable speed V-belt drive type to provide a continuous speed variation within the range of speed adjustment.

11. The combination defined in claim 10 wherein said variable speed transmission comprises a first pair of axially aligned relatively axially shiftable opposed cone pulleys resiliently biased toward axial abutment, a second pair of axially aligned relatively axially shiftable opposed cone pulleys mounted in spaced parallel relation to said first pair, a V-belt interconnecting said pulleys, and means for shifting the axial spacing between said second pair of cones to produce a simultaneous and opposite axial spacing shift of said first pair to vary the angular velocity ratio between said pulleys.

12. The saw defined in claim 5 wherein said machine power driven means comprises a hollow support structure comprising a central portion extending along the rear edge of said table and pivotally mounted thereon and a hollow arm rigidly secured to each end of said central portion, said arms extending over said table normal to said central portion at each side of said saw unit, a pair of shafts which are respectively journalled in the arms of said housing, a chain and sprocket drive mechanism interconnecting said shafts through said central support structure portion, said shafts projecting outwardly of the free ends of said structure arms and each having a workpiece feed roll secured thereto on the projecting portion of said shafts, a drive motor mounted on one arm of said support structure, a drive train drive connecting said motor to the shaft journalled in said one arm, and means for shifting the other of said arms in a translatory path relative to said central portion and said one arm to vary the spacing between said shafts and thereby adjust the tension of said drive chain while maintaining the parallel relation of said feed roll shafts.

13. A saw adapted to accommodate wide varieties of widths, depths and hardnesses of boards comprising a work support table, a work guide fence extending parallel to one side of said work support table, means including portions of said table for clamping said fence to said table at any selected one of a plurality of predetermined positions spaced at right angles to said one side of said table to effect major width adjustments of the cut, power driven means for feeding a work piece along said fence at a selected speed comprising driven rollers axially movably mounted for selective positioning laterally with respect to said fence and adapted to effect feeding movement of a work piece along said fence and said table, and a power driven circular saw unit mounted above said table for movement laterally with respect to said table to effect minor or vernier width adjustment of the cut and normal to said fence to a position to cooperate with said fence and said rollers to determine the distance of the cut from the fence and properly locate the sawing unit with respect to the rollers in a sawing operation and for movement toward and away from said table to vary the depth of cut as required.

References Cited in the file of this patent

UNITED STATES PATENTS

| | | |
|---|---|---|
| 210,085 | Bowen et al. | Nov. 19, 1878 |
| 400,991 | Abbott | Apr. 9, 1889 |
| 652,466 | Thomas | June 26, 1900 |
| 940,016 | Hick | Nov. 16, 1909 |
| 1,067,360 | McSorley et al. | July 15, 1913 |
| 1,109,747 | Giertsen | Sept. 8, 1914 |
| 1,181,402 | Mershon | May 2, 1916 |
| 1,482,631 | De Linieres | Feb. 5, 1924 |
| 1,563,325 | Bielaski | Dec. 1, 1925 |
| 1,735,773 | McIlvanie | Nov. 12, 1929 |
| 1,956,835 | Roener | May 1, 1934 |
| 2,032,585 | Lewellan et al. | Mar. 3, 1936 |
| 2,120,383 | Watson | June 14, 1938 |
| 2,317,568 | Wallace et al. | Apr. 27, 1943 |
| 2,329,345 | Gardner | Sept. 14, 1943 |
| 2,332,888 | Bostwick et al. | Oct. 26, 1943 |
| 2,646,088 | Smith | July 21, 1953 |

FOREIGN PATENTS

| | | |
|---|---|---|
| 15,098 | Sweden | Dec. 6, 1902 |